Oct. 27, 1953   T. J. KEARNEY ET AL   2,656,652
APPARATUS FOR TREATMENT WITH LIQUIDS
Filed Sept. 24, 1948   8 Sheets-Sheet 1

WITNESSES
Thomas W. Kerr, Jr.
A. J. Brittingham

INVENTORS:
Thomas J. Kearney and
Floyd E. McGregor,
BY Paul & Paul
ATTORNEYS.

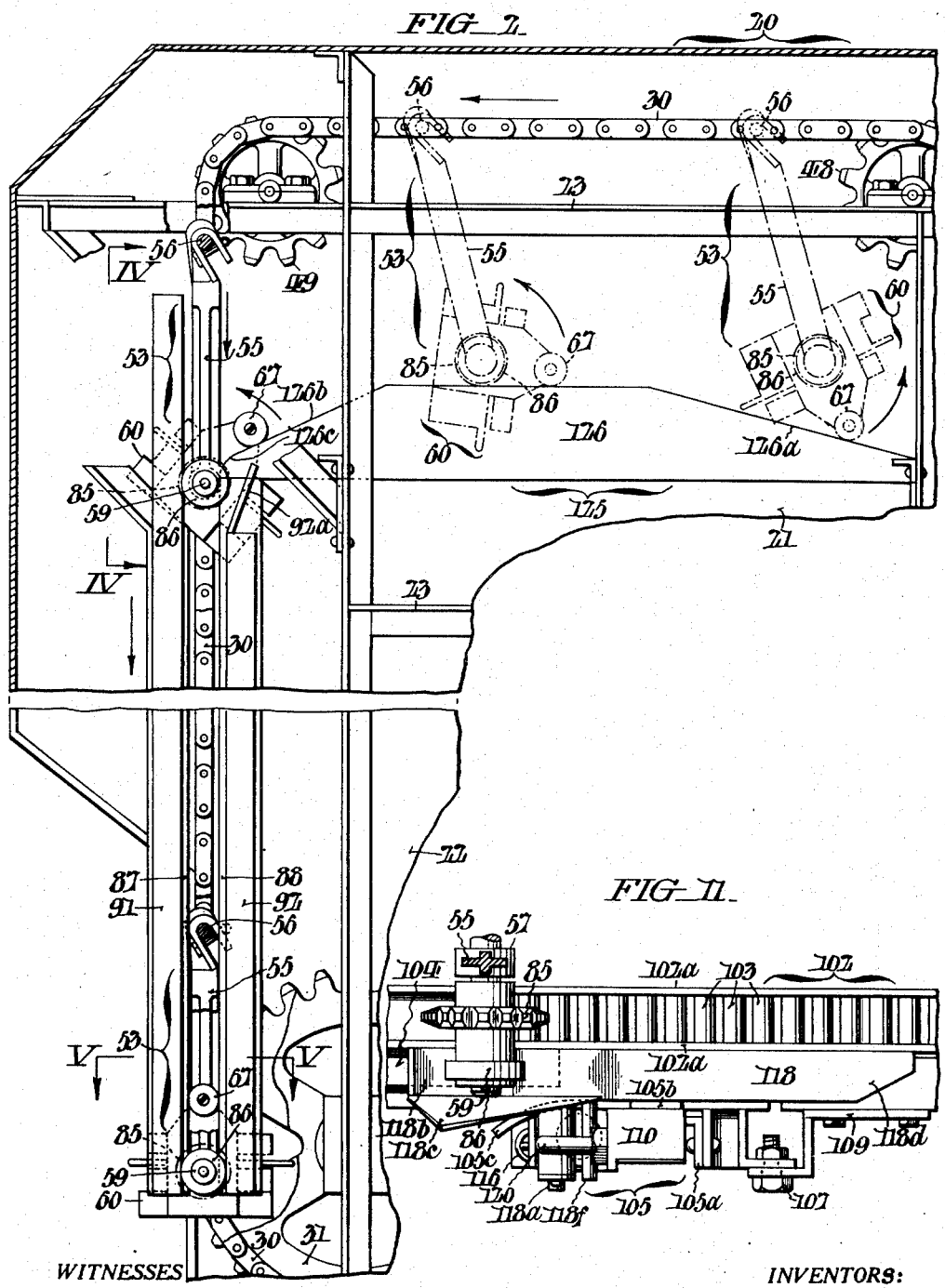

Oct. 27, 1953     T. J. KEARNEY ET AL     2,656,652
APPARATUS FOR TREATMENT WITH LIQUIDS
Filed Sept. 24, 1948     8 Sheets-Sheet 3
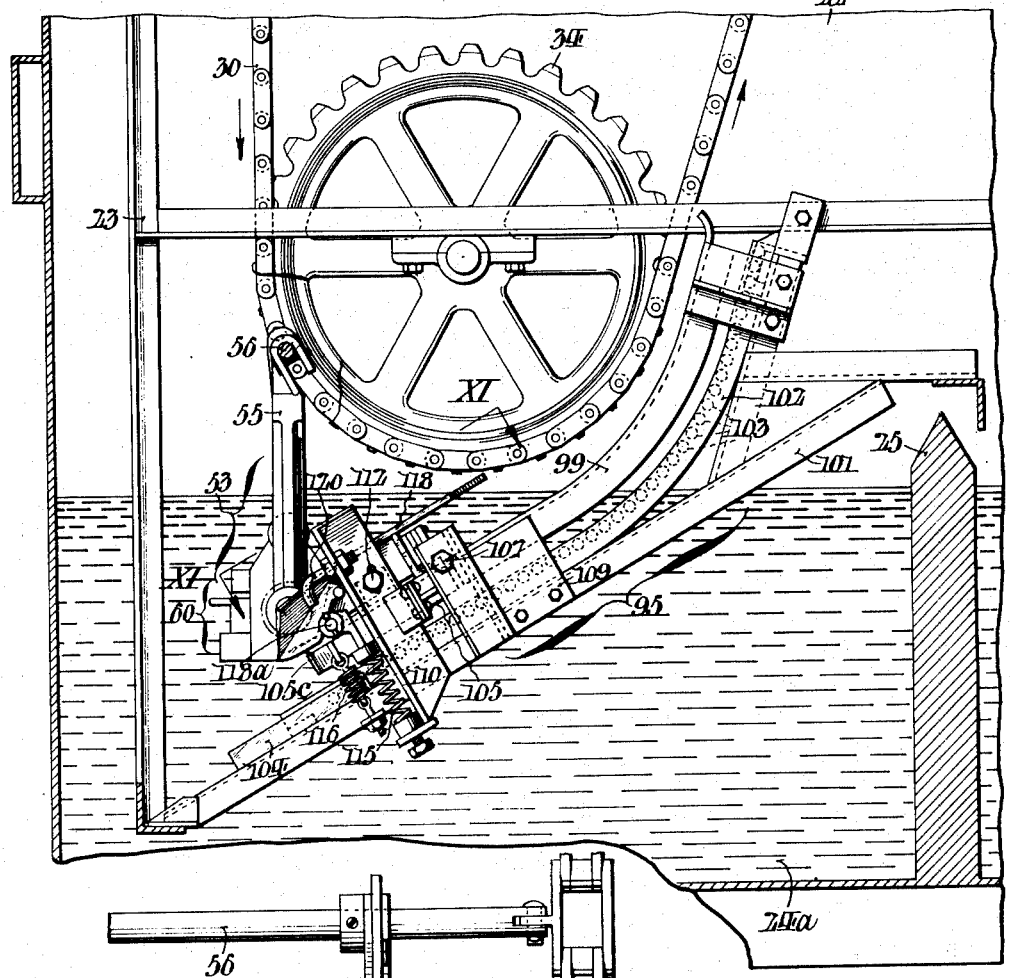
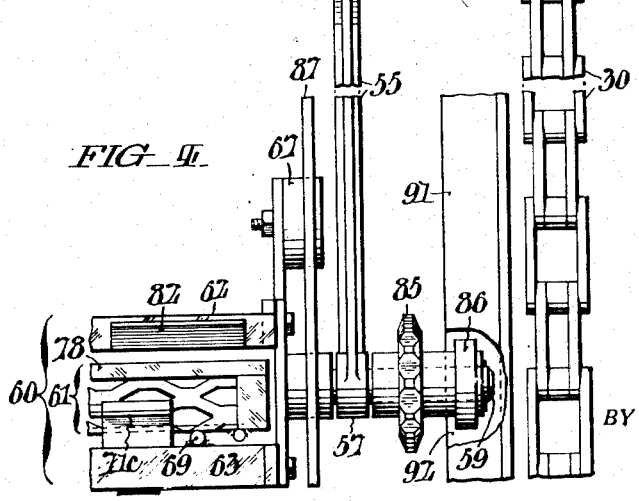
INVENTORS:
Thomas J. Kearney and
Floyd E. McGregor,
BY
ATTORNEYS.

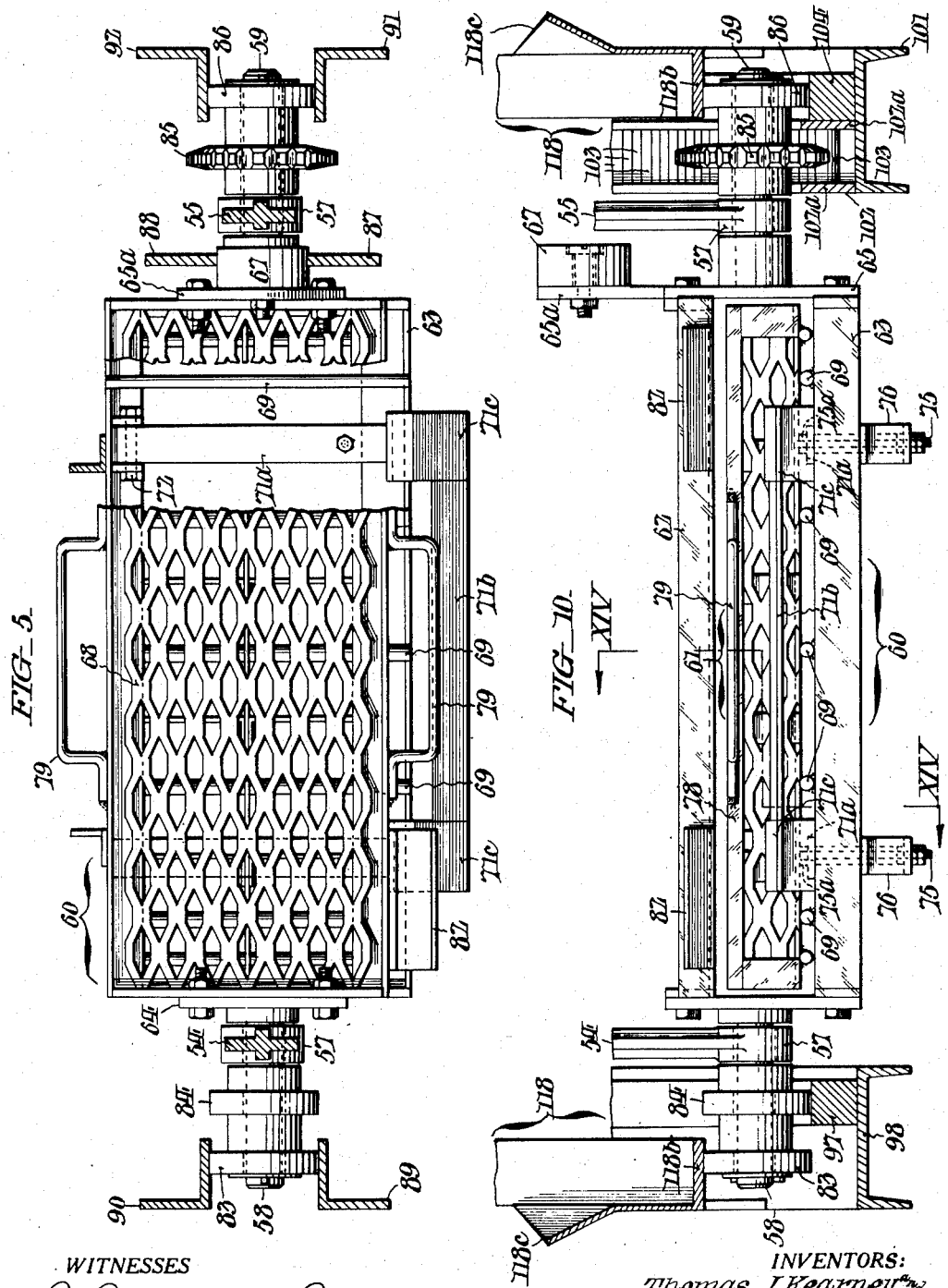

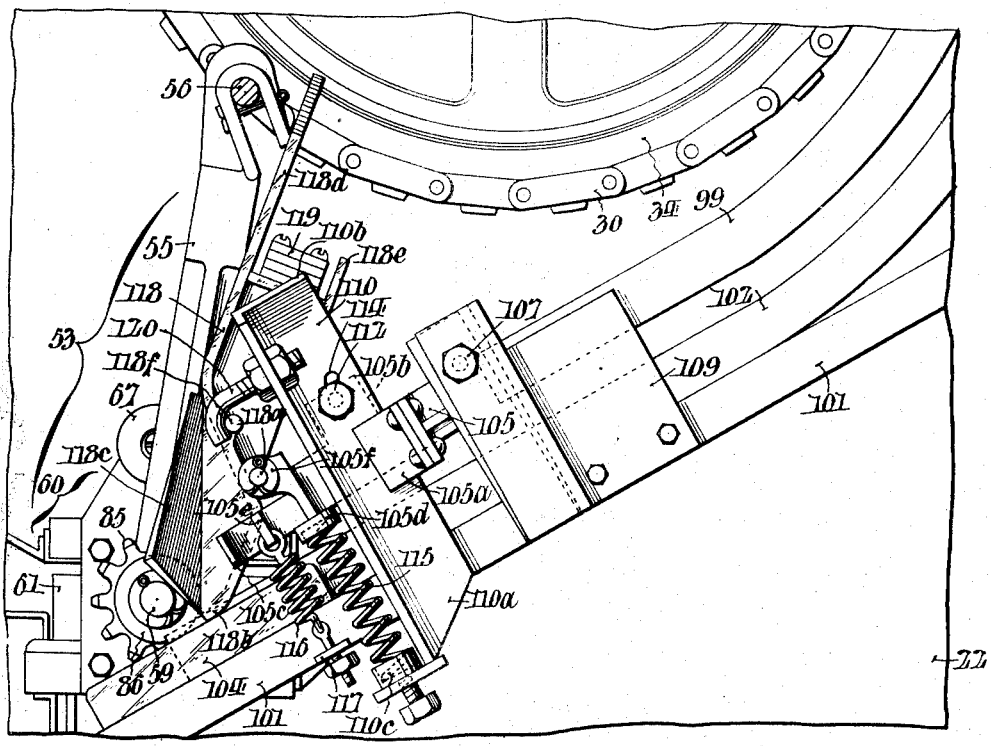
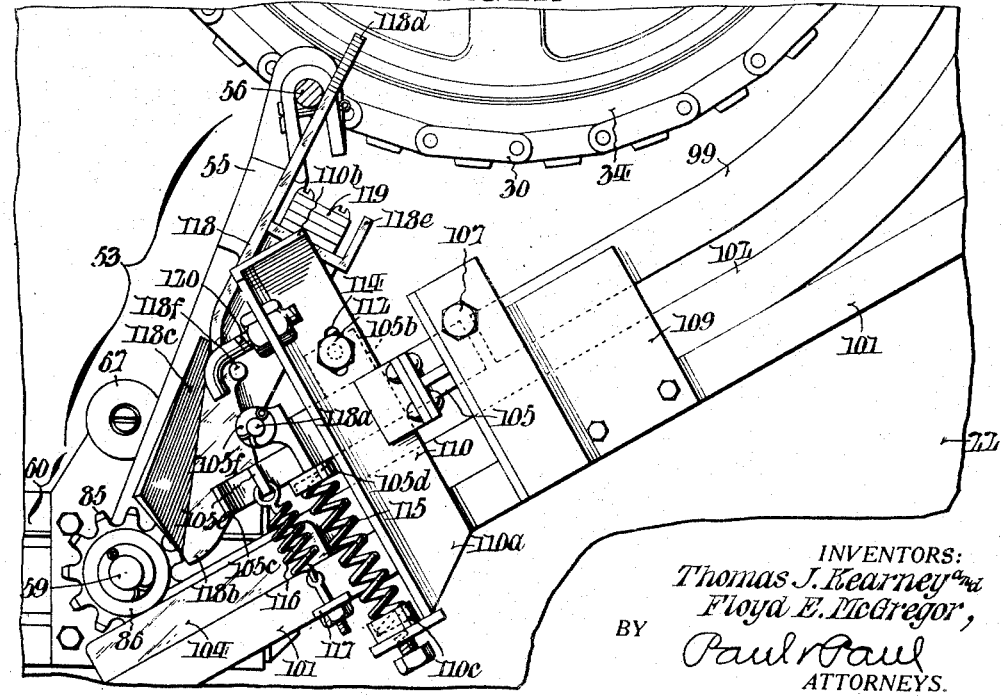

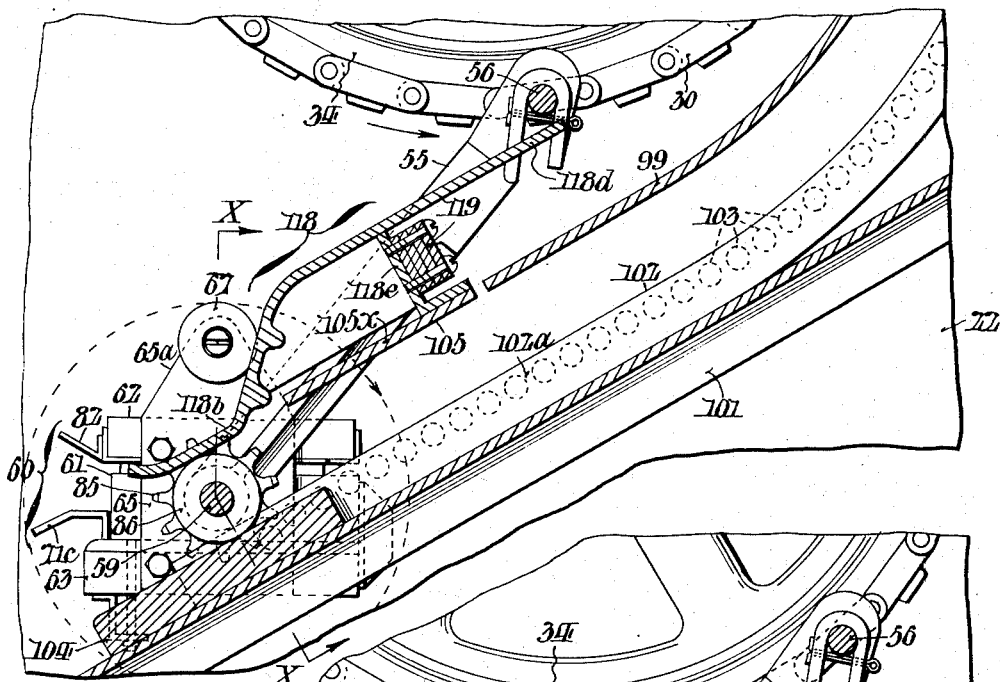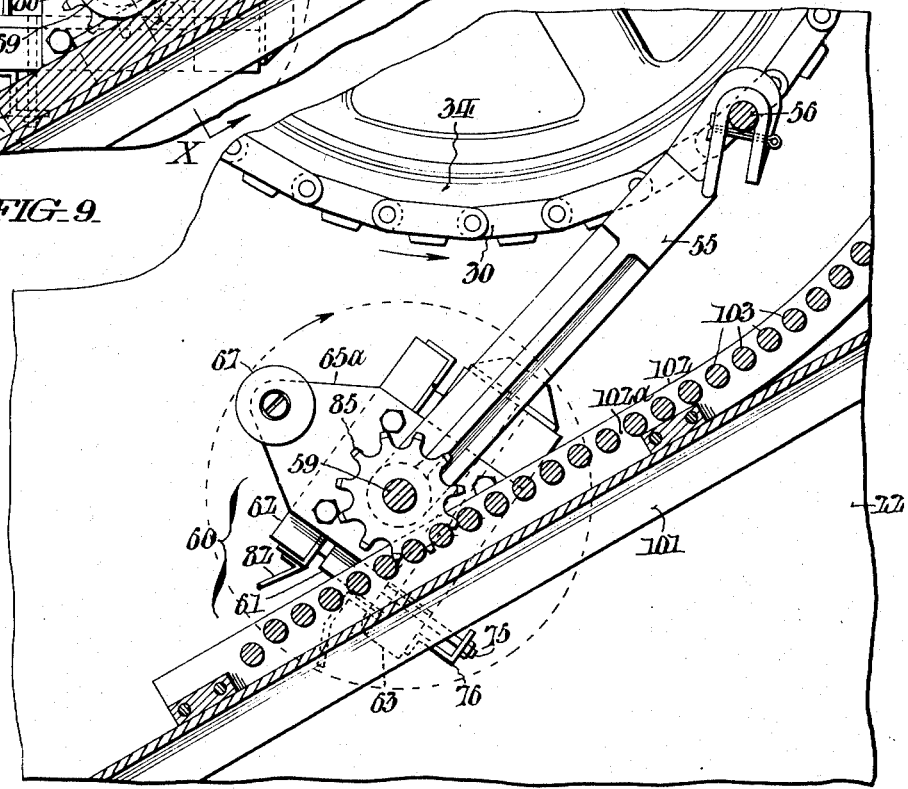

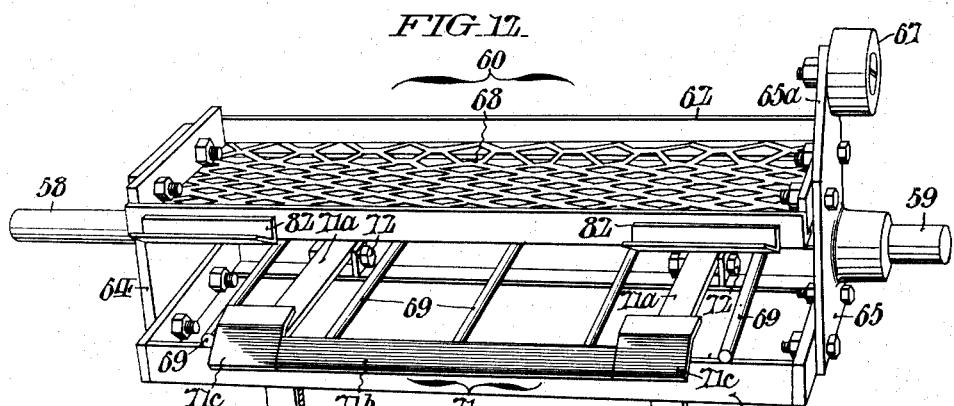
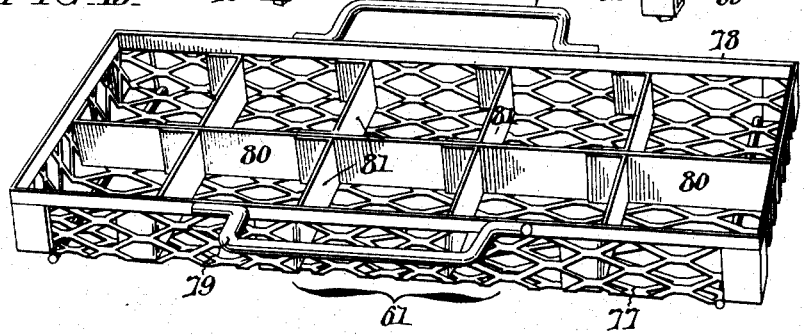
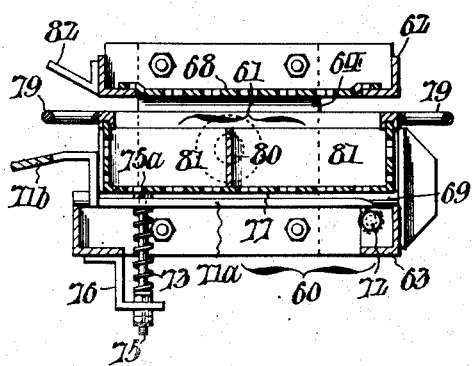
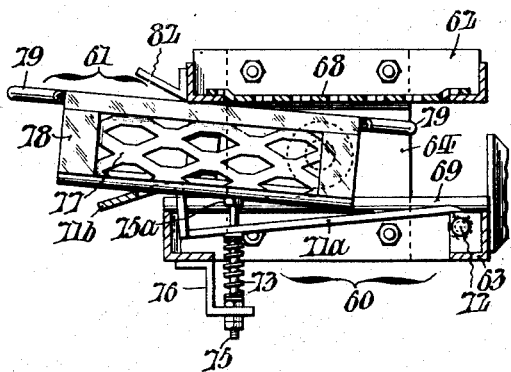

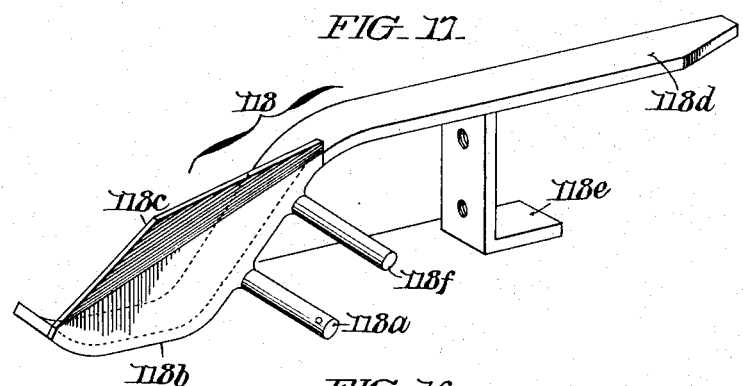
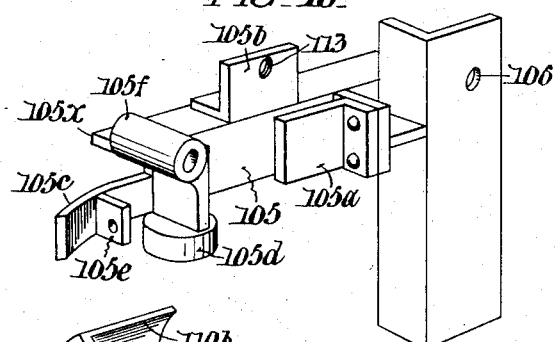
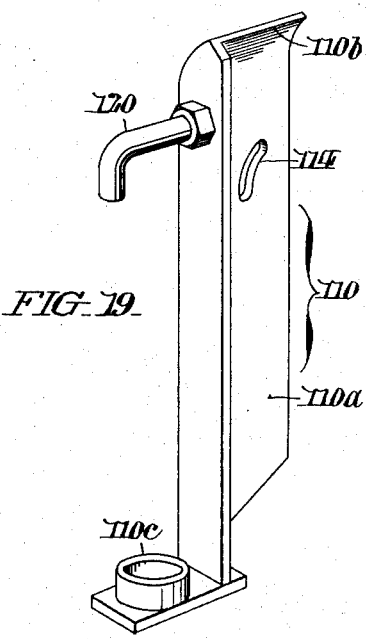
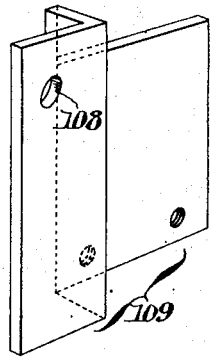

Patented Oct. 27, 1953

2,656,652

UNITED STATES PATENT OFFICE 2,656,652

APPARATUS FOR TREATMENT WITH LIQUIDS

Thomas J. Kearney and Floyd E. McGregor, Detroit, Mich., assignors to Detrex Corporation, Detroit, Mich., a corporation of Michigan Application September 24, 1948, Serial No. 51,016

18 Claims. (Cl. 51—164)

This invention relates to apparatus and methods for cleaning, degreasing or otherwise treating articles of different kinds with volatile solvents such as chlorinated solvents including carbon tetrachloride, trichlorethylene, and perchlorethylene. These solvents are liquid at ordinary temperatures and pressures, and are non-flammable at ordinary temperatures. The articles or work to be cleaned may be treated either with the liquid solvent, or with the solvent vapor, or with both. In many cases it is desirable to agitate the work in hot or boiling liquid solvents.

More specifically our invention is concerned in part with treating apparatus of the general type disclosed in U. S. Patent No. 2,107,369, granted to Clarence F. Dinley on February 8, 1938, for removing oil and/or grease, as well as dirt and chips, from finished machine parts and similar articles by treatment with solvents of the kind mentioned above. In the patented apparatus groups of the articles to be cleaned are supported in carriers hung from endless chain conveyor which traverse a circuitous course over one or more wells containing liquid solvent, and which is diverted downwardly for immersion of the carriers without agitation of the articles in them while in the liquid, said wells being enclosed in a housing, and said conveyor extending to loading and unloading station located exteriorly of said housing.

The chief aim of our invention is to enable treatment in such apparatus in much less time than possible heretofore without sacrifice in the thoroughness of the cleaning or degreasing. This desideratum is realized in practice, as hereinafter more fully set forth, through provision of reticulate trays in which several articles may be placed at a time and maintained in definite separation against relative movement and contact with each other; reticulate tray holders pivotally mounted on the carriers and having releasable means for retaining the trays; mechanism along the path of the conveyor for positively rotating the holders repeatedly during submersion in the solvent liquid in the wells and also after emergence from the wells for removal of adhering solvent from the articles; the trays and holders; and means for controlling the carriers as they approach the rotating mechanism to prevent shocks or jars likely to result in injury to the work or rapid wear or breakage of the carriers, the tray holders, on the rotating mechanism.

In cleaning so characterized, it is a further aim of our invention to insure that said holders are right side up before the carriers reach the loading and unloading station. This objective is in turn realized in practice, as also more fully disclosed hereinafter, through provision of simple and reliable means whereby, in the event that the holders are upside down or tilted after they emerge from the wells and before they pass to the exterior of the housing, they will be additionally turned to the extent necessary.

Other objects and attendant advantages will appear from the following detailed description of the attached drawings, wherein:

Fig. 2 is a fragmentary view in longitudinal section of the upper front end portion of the apparatus, drawn to a larger scale.

Fig. 3 is a fragmentary view, in longitudinal section of the lower front end portion of the apparatus, likewise drawn to a larger scale, and showing part of a mechanism by which the tray holders are rotated.

Fig. 4 is a fragmentary view in elevation looking as indicated by the angled arrows IV—IV in Fig. 1.

Fig. 5 is a detail cross section taken as indicated by the angled arrows V—V in Fig. 2.

Figs. 6, 7, 8 and 9 are fragmentary views like Fig. 3 drawn to a still larger scale and showing sequential steps in the rotation of the tray holders.

Fig. 10 is a detail view in cross section taken as indicated by the angled arrows X—X in Fig. 8.

Fig. 11 is a fragmentary section taken as indicated by the angled arrows XI—XI in Fig. 3.

Figs. 12 and 13 are perspective views respectively of one of the tray holders and of one of the trays.

Fig. 14 is a cross sectional view taken as indicated by the angled arrows XIV—XIV in Fig. 10.

Fig. 15 is a view like Fig. 14 showing how a tray is inserted into its holder.

Figs. 16, 17, 18 and 19 are perspective views of various parts of the mechanism by which the tray holders are rotated.

Figure 1:
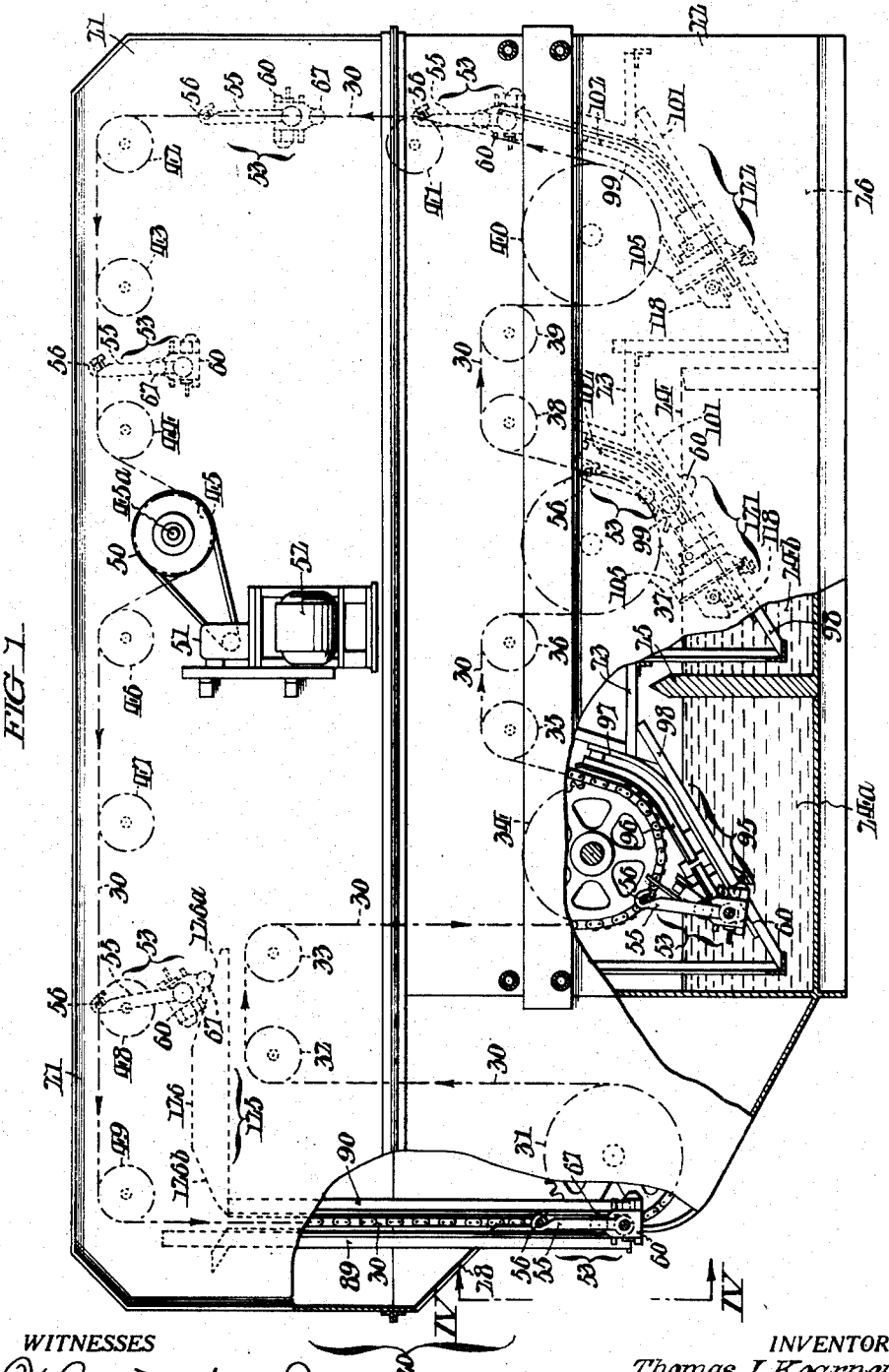
Fig. 1 is a view in side elevation, with portions broken out and others in longitudinal section, showing a treating apparatus conveniently embodying the present invention, and suitable for the practice of our improved method of cleaning.

As herein illustrated, our improved treating apparatus has a closed housing 20 with upper and lower sections 21 and 22. The walls of the housing are formed from sheet metal and are supported by a skeleton framework of structural steel which is partly shown and generally designated 23 in Figs. 2 and 3. Within the housing 20 is a compartment 24 which, in this instance, is subdivided by a central transverse partition 25 into two solvent wells 24a and 24b respectively containing cleaning solvent and clean rinsing solvent. Also within the housing beyond the right hand end wall 25 of the compartment 24 is a clear space 26. As shown in Fig. 1, the upper section 21 of the housing 20 overhangs the lower section 22 at the left hand or loading and unloading end of the apparatus and is traversed by a chain conveyor comprising two laterally-spaced, endless sprocket chains 30. As shown, the chains 30 trace a circuitous course, in the direction of the arrows in Fig. 1, said course being defined by the sprocket wheels designated 31—49. The sprocket wheels 34, 37 and 40 are respectively disposed directly over the solvent wells 24a, 24b and the clear space 26. The conveyor emerges through an opening 28 in the bottom of the overhanging portion of the upper housing section 21 at the loading and unloading end of the apparatus. The shaft 45a of the sprocket wheel 45 extends to the exterior of the housing, and, at its outer end, has a sprocket 50 which is chain connected to a speed reducing unit 51 driven by an electric motor indicated at 52.

Attached to the chain conveyor at spaced points are work carriers 53 each comprising a pair of arms 54 and 55 which are pivotally suspended from a rod 56 extending transversely between the sprocket chains 30. Journalled in bearings 57 at the lower ends of each pair of the arms 54, 55 are the trunnions 58 and 59 of a holder 60 for reception of a tray 61 into which the articles to be cleaned are placed. As best shown in Fig. 12, each tray holder 60 is formed from structural metal parts with horizontally arranged oblong frames 62 and 63 which, at opposite ends, are bolted to connecting plates 64 and 65. The frames 62 and 63 are equally spaced and centered relative to the trunnions 58 and 59 which extend laterally from the end plates 64 and 65, the latter of the two end plates having an upward arm extension 65a with a roller 67 at the top. The frame 62 is spanned by a diaphragm 68 of metallic screening, and the side members or longitudinals of the frame 63 are spanned at intervals by round section cross bars 69. As will be presently seen, the frame 62 serves as a cover for the tray 61, and the frame 63 serves as a supporting shelf with said tray resting directly upon the cross bars 69 as shown in Fig. 14. For retainment of the tray 61, there is provided a latch element 71 in the form of a yoke having side arms 71a pivoted at 72 to the rear longitudinal of the frame 63 and connected at their swinging ends by a sloped tie bar 71b which is flush with terminal bevel cam retroversions 71c on said arms. Compression springs 73 surrounding upstanding bolts 75 on Z lugs 76 welded to the front longitudinal of frame 63, tend to yieldingly urge the latch member 71 upward as far as permitted by stop heads 75a at the tops of said bolts. The tray 61, see Fig. 13, is likewise made up from structural metal parts, with its top, sides and ends integrally fashioned from reticulate material 77 and reinforced perimetrically and also at its corners by a frame 78. Centrally of its opposite longitudinals the tray 61 is provided with grasp handles 79. When its use is intended for small articles of different kinds which it is desired to keep separated, the tray 61 may be subdivided by lengthwise and crosswise partitions 80 and 81 as shown. In introducing the tray 61, it is brought up, with either of its long sides foremost, and thrust into the interval between the frames 62 and 63 of the holder 60. In this operation, bevel cam lugs 82 on the front longitudinal of the frame 63 and the bevel cam bar 71b of the latch member 71 serve as guides, said latch member yielding to momentary downward displacement as shown in Fig. 15 and as permitted by the springs 73, until the tray is thrust home in the holder, when said element will snap upward into retaining position as in Fig. 14. It will now be apparent that, with the tray 61 in place, the reticulate web of the upper frame of the holder acts as a cover to keep the work in separate compartments and to prevent the articles placed in the tray from falling out as the holder is turned on its trunnions in a manner presently explained. The tray holder and tray per se, constitute the subject matter of a separate patent application, Serial No. 51,017, concurrently filed herewith by Thomas J. Kearney, now Patent No. 2,575,278, dated November 13, 1951.

Mounted on the trunnion 58 outwardly of the corresponding suspension arm 54 (Figs. 5 and 10) is a pair of spaced rollers 83 and 84 which are free to rotate independently; and mounted on the other trunnion 59 beyond the suspension arm 55, are a fixed toothed pinion 85 and a freely rotative roller 86.

The holders 60 are charged with the trays 61 as the conveyor moves downward from the sprockets 49 at the left hand end of the apparatus in Fig. 1. During this downward travel, the holders 60 are held upright and prevented from rotating through engagement of the rollers 67 on the upward arms 65a between a pair of fixed vertically arranged track rails 87 and 88 at the near side of the apparatus in Fig. 2 and through concurrent engagement of the rollers 83 and 86 between other parallel vertical guides 89, 90 and 91, 92 respectively at opposite sides of the apparatus.

After rounding the sprockets 31, the conveyor chains move upward to the sprockets 32, then horizontally for a short distance to the sprockets 33, and then downwardly again to the sprockets 34 incident to the rounding of which the tray holders are immersed in the cleaning liquid within the solvent well 24a.

For the purpose of rotating the tray holders 60 while submerged in the solvent well 24a as the carriers 53 round the sprockets 34, we have provided the mechanism comprehensively designated 95 in Figs. 1, 3, 4 and 6–11, part of this mechanism being located at one side of the apparatus and part at the other side. The portion of this mechanism at the far side of the apparatus, see Figs. 1 and 10, includes a segmental track which is disposed within the solvent well 24a beneath the sprocket 34 and formed by spaced parallel rail sections 96 and 97 one above the other, the front end of the lower rail 97 extending somewhat beyond the front end of the upper rail 96 and both being partly inclined upwardly in the direction of rotation of said sprocket wheel and partly curved in concentric relation thereto. Both rails 96 and 97 are rigidly supported by a sloping strut 98 of the framework 23 of the apparatus. As shown, the rail 96 is fashioned from angle section bar material arranged for contact of its lateral flange from beneath by the rollers 83 on the tray holders 60. The rail 97 is formed from square section bar stock and is adapted to be contacted from above by the rollers 84 of the carrier 53. The portion of the mechanism at the near side of the apparatus, see Figs.

3, 5–11, comprises fixed segmental track rails 99 and 102 which are shaped and disposed like the rails 96 and 97 at the far side and similarly supported by a sloped strut 101 of the framework 23. The rail 99 is angular in cross section and arranged for contact of the underside of its lateral flange by the rollers 86 on the tray holders 60, but the segment 102 is formed as a rack with a series of pins 103 extending crosswise between laterally-spaced side strips 102a and adapted to be engaged from above by the pinions 85 on the tray holders. Secured to the strut 101 at the entrant end of the track so as to be engaged from above by the rollers 86 on the tray holders 60, is a relatively short track piece 104 of rectangular cross section on which the rollers 86 ride until the pinions 85 reach the pin rack.

In order to control the carriers 53 as they approach the two tracks, we have further provided levers 105, one at each side of the apparatus. Except for being left and right hand, these levers 105 are identical. As best shown in Fig. 16, each lever 105 is constructed from structural metal parts with an aperture 106 for passage of the shank of a headed fulcrum stud 107, the shank of which latter extends through hole 108 of built up bracket 109 (Figure 18) affixed to one side edge of the strut 101 (Fig. 3). Welded to the strut 101 adjacent the bracket 109 is a perpendicularly arranged angle piece 110, see Fig. 19, whereof one flange 110a is abutted by the longitudinal angle section component of the lever 105 and is engaged from the opposite side by an angle lug 105a bolted to the front side of said lever. By virtue of this construction, the lever 105 is constrained to up and down movement in a single plane. As a further aid to this end, a shouldered bolt 112 has its shank fastened through an aperture 113 by a nut and lock washer in an upstanding lug 105b on the lever 105 and extending through an arcuate slot 114 in the flange 110a of the angle piece 110 concentric in relation to the fulcrum bolt 107. From Fig. 19 it will be noted that the flange 110a of angle piece 110 is curved outwardly at the top as at 110b, and, from Fig. 16, that the vertical flange of the longitudinal component of the lever 105 is extended beyond the horizontal flange and curved outwardly as at 105c. A coil spring 115 in compression between cups 105d and 110c respectively at the bottom of the lever 105 and the bottom of the angle piece 110, yieldingly urges said lever upward as far as permitted by an opposing helical spring 116 in tension between fixed anchorages 105e and 117 respectively on the curved end portion of said lever and on the strut 101. The springs 115 and 116 are both adjustable as will be readily seen from Fig. 6, and oppose each other to normally maintain the lever 105 yieldingly in a neutral position longitudinally of the track. Adjacent the free end of the lever 105 is a transverse axis bearing 105f for the laterally projecting fulcrum pin 118a of a control element 118 which is separately illustrated in Fig. 17. As shown, this control element 118 is in the form of a spoon having at its front end a scoop 118b with a lateral flare 118c, and a relatively long flat rearward shank 118d which carries a counterweight 119. Normally the control element 118 occupies the position in which it is shown in Fig. 3 with its shank 118d parallel to the straight portion of the track rail 99, this position being determined by engagement of the angle lug 118e, to which the counterweight 119 is directly secured, with the lateral flange 105x of lever 105, see Fig. 8. The swing of the control element 118 about its fulcrum in counterclockwise direction is limited by engagement of a stud projection 118f with a stop 120 on the lateral flange of the angle piece 110 as shown in Fig. 6. The supporting lever 105 and associated parts for the control element at the far side of the machine in Fig. 1, it is to be understood, are exactly like those just described in detail but reversed in order.

Upon descent of the carrier 53 to the mechanism 95 as in Fig. 3, the rollers 83 and 86 on the trunnions of the tray holder 60 simultaneously enter the scoops of the two control elements 118, causing the latter to be swung counterclockwise to upright position as shown in Fig. 6. This occurs as the conveyor chains start rounding the sprockets 34, with consequent imposition of a slight drag on the carrier whereby the latter is temporarily restrained and thus prevented from swinging. Entry of the rollers 83 and 86 into the scoops 118b is assured by the counter sloped side flares 118c of the control elements 118. As the movement of the conveyor chains continues, with attendant decrease in the angularity of the carrier arms 54 and 55, the rollers 83 and 86 move gently downwardly, with a slight reverse travel as considered with respect to the final direction of movement of the carrier, on the inclined interior surfaces of the scoops of the elements 118 to a point beyond the ends of said scoops. The roller 84 eventually engages the track rail 97, and the roller 86 engages the short rail piece 104 as shown in Fig. 7. The rollers 84 and 86 are thus deposited on the track rails without free swinging of the carriers. Upon being released, as just explained, the control elements 118 are automatically returned to normal position by the action of their counterweights 119. Dropping of the elements 118 is assured through contact of the transverse pin 56 of the conveyor on which the carrier 53 is hung, with the shank ends 118d of said elements as also shown in Fig. 7. By continued drag of the carrier in the further advance of the conveyor, the rollers 83 and 86 enter beneath the scoops of the control elements 118 which are now held down by the action of springs 116 upon the levers 105, the roller 86 riding on the short track 104 until the pinion 85 encounters the first of the cross pins 103 of the gear rack 102, said first pin being depressed somewhat below the plane of the others as shown in Fig. 9, to facilitate the interengagement. As the pinion 85 rolls onto the second pin of the gear rack, it rises slightly while still held down by the control element 118 as in Fig. 8 which is allowed to rise with it under the yielding action of the spring 116 upon lever 105. In its further travel, the pinion 85 is held to the pin rack as the roller 86 first passes beneath the lateral flange 105x of lever 105 and finally beneath the lateral flange of the rail 99, with resultant positive and uniform turning of the tray holder 60 about its trunnion axis while immersed in the solvent well 24a as the conveyor chains complete the rounding of the sprockets 34.

From the sprockets 34, the conveyor chains travel up to the sprockets 35 and across to the sprockets 36, whereby the carrier 53 is advanced over the partition 25 of the compartment 24, and then down to the sprocket wheels 37. In rounding the sprockets 37, the tray holder 60 is immersed in the solvent well 24b and at the same time it is turned on its trunnion axis several times by mechanism 121 similar to the mechanism 95, with the result that the work articles in the tray are subjected to the rinsing action of the relatively clean solvent in said well.

In their further travel, the conveyor chains 30 move upward to the sprockets 38 and then across to the sprockets 39 whereby the carrier 53 is lifted over the rear end wall of the trough 24. From this point, the conveyor chains again move downward to undertravel the sprockets 40 incident to which the tray holder 60 of the carrier 53 is once more turned several times in the clear space 26 whereby most of the liquid cleaning solvent adhering to the tray holder 60 and the articles in the tray 61 is thrown off. Further drainage of the liquid takes place as the conveyor chains complete the circuit upward within the rear end of the housing and longitudinally of the top of the latter in rounding the sprockets 42—49.

In order to insure that the tray holders 60 are right side up before emerging from the housing 20 at the front end, we have additionally provided a righting means which is comprehensively designated 125 in Figs. 1 and 2, and shown as located directly beneath the sprockets 48 and 49. From Fig. 2 it will be observed that this righting means comprises a horizontally arranged cam element in the form of a plate 126 which is rigidly supported by the framework of the apparatus, and which has cam risers 126a and 126b respectively at opposite ends. In the event that, by reason of unbalanced distribution of the articles within them, the tray holders 60 are not upright as they approach the cam plate 126, they will be further turned about their trunnion axes, first by action of the slope 126a of said plate upon the rollers 67, and somewhat later by similar action upon said rollers by the slope 126b as the conveyor chains round the sprockets 49, and pass downward of the front end of the housing. As shown, the cam plate 126 extends to the vertical guide rails 87 and 88 and is there rounded as at 126c to direct the rollers 67 into the interval between said rails. It is also to be observed that one of the flanges of each of the vertical angle section guide rails 92 is extended upwardly and bent rearwardly for the formation of a cam slope at 92a adjacent the rounded end 126c of cam plate 126 to direct the rollers 83, 86 on the tray carriers into the guide interval between said rail and the companion angle section rail 91. Thus, as the carriers 43 travel downward at the front end of the apparatus for unloading, they will not only be upright but will be prevented from turning while being unloaded and recharged.

Having thus described our invention, we claim:

1. In apparatus for treatment with liquids, a well containing treating liquid; a conveyor movable over the well; a carrier with an arm pivotally suspended from the conveyor, and with a holder for articles to be treated rotatively supported by the arm; an under-traveled wheel by which the conveyor is diverted downwardly into the well for immersion of the holder in the liquid; a stationary segmental track with fixedly spaced parallel upper and lower rails beneath the wheel and inclined upwardly in the direction of wheel rotation, the lower rail extending beyond the upper rail at the entrant end of the track; a roller on the pivot axis of the holder; and control means including a restraining element fulcrumed on a transverse axis above the track and adapted to be actuated by the roller as the carrier is lowered into the trough to ease approach of the roller to the extended portion of the lower track rail and for guiding the roller beneath the upper track rail; and means whereby the holder is rotated as it continues its travel along the track while submerged in the liquid.

2. Treating apparatus according to claim 1, wherein the holder is reticulate for access of the liquid to the articles during the period of submergence.

3. Treating apparatus according to claim 1, wherein the pivoted element of the control means is of a spoon-like configuration with a scoop front end and a rearwardly extending counter-weighted shank, said element being medially fulcrumed and normally stopped in an angular position, whereby, upon initial engagement of its scoop by the roller, it is swung upright, and upon momentary recession of the roller within the scoop onto the lower track rail incident to decrease in the angularity of the carrier arm as the movement of the conveyor continues, it is automatically returned to its normal position under gravitational influence, so that in advancing further, the roller is obliged to under-travel the scoop and be thereby directed beneath the upper track rail.

4. Treating apparatus according to claim 1, wherein the control means further includes a supporting member yieldingly sustained from the track, and wherein the pivoted element is of spoon-like configuration with a scoop at its front end and a rearwardly extending counter-weighted shank, said element being medially fulcrumed on the supporting member and normally stopped in an angular position, whereby, upon engagement of the scoop by the roller, it is swung upright, and upon momentary recession of the roller within the scoop onto the lower track rail incident to decrease in the angularity of the carrier arm as the movement of the conveyor continues, it is automatically returned to normal position under gravitational influence, so that in advancing further, the roller is obliged to under-travel the scoop and be thereby directed beneath the upper track rail.

5. Treating apparatus according to claim 1, wherein the control means further includes a lever arranged lengthwise of the track, opposing springs normally maintaining the lever yieldingly in a normal position, and wherein the pivoted element is of spoon-like configuration with a scoop at its front end and with a rearwardly extending counter-weighted shank, said element being medially fulcrumed on the lever and stopped in substantially horizontal position, whereby upon engagement of its scoop by the roller on the holder, it is swung upright, and upon momentary recession of the roller within the scoop onto the extended portion of the lower track rail incident to decrease in the angularity of the carrier arm as the movement of the conveyor continues, it is automatically returned to normal position under gravitational influence, so that in advancing further, the roller is obliged to under-travel the scoop and be thereby directed beneath the upper track rail.

6. Treating apparatus according to claim 1, wherein the holder rotating means comprises a toothed pinion fast on the fulcrum axis of the holder, and a rack along the track beyond the control means to cooperate with the pinion.

7. Treating apparatus according to claim 1, wherein the well is enclosed in a housing with provision of a clear space beyond it; wherein another under-traveled guide wheel diverts the conveyor downward in said clear space; wherein another fixed segmental track similar to the first mentioned is disposed adjacent the second guide wheel; and wherein a control means and a rotating means associated with the latter track operate to govern the carrier and turn the holder to facilitate drainage of adhering or entrained cleaning liquid from said holder and from the articles within it.

8. Treating apparatus according to claim 1, wherein the well is enclosed in a housing; wherein a portion of the conveyor circuit is exterior to the housing for loading and unloading of the carrier; wherein the holder has a frontal opening for insertion of a tray for the articles; and further including means for additionally rotating the tray holder to the extent required to bring it upright with its front end accessible for removal of the tray at the loading and unloading station if it should not be so after withdrawal from the well and before emerging from the housing.

9. In apparatus for treatment with liquids, a well containing cleaning liquid; a conveyor movable over the well and comprising a pair of laterally spaced conveyor chains; an attached carrier comprising a pair of arms respectively pivotally suspended from the conveyor chains, and a holder for articles to be cleaned having trunnions at opposite ends engaged in bearings at the lower ends of the arms; coaxial undertraveled guide wheels by which the belts are diverted downwardly within the well for immersion of the holder in the liquid; stationary segmental tracks with fixedly spaced parallel upper and lower rails, respectively beneath the wheels and inclined upwardly in the direction of wheel rotation, the lower rails extending beyond the lower rails; at the entrant end of the track rollers on the trunnions of the holder; and control means including elements fulcrumed on transverse axes above the track and adapted to be acted upon by the rollers as the carrier is lowered into the trough to ease the approach of the rollers to the extended portions of the lower track rails and for guiding them beneath the upper rails; and means whereby the holder is rotated as it continues its travel along the track rails while submerged in the liquid.

10. Treating apparatus according to claim 9, wherein the holder is reticulate for access of the liquid to the articles during the period of submergence.

11. Treating apparatus according to claim 9, wherein the pivoted elements of the control means are of spoon-like configuration with scoops at their front ends and with rearwardly extending counterweighted shanks pivotally supported and stopped in an angular position, whereby upon initial engagement of their scoops by the rollers, they are swung upright, and upon momentary recession of the rollers within the scoops onto the lower track rails incident to decrease in the angularity of the carrier arms as the movement of the conveyor continues, they are automatically returned to normal position under gravitational influence, so that in advancing further, the rollers are obliged to under-travel the scoops and be thereby directed beneath the upper track rails.

12. Treating apparatus according to claim 9, wherein the control means further includes supporting members yieldingly sustained respectively from the tracks, wherein the pivoted elements are of spoon-like configuration with scoops at their front ends and with rearwardly extending counterweighted shanks, said elements being medially fulcrumed respectively on the supporting members and normally stopped in an angular position, whereby, upon engagement of the scoops by the rollers, they are swung upright, and upon momentary recession of the rollers within the scoops onto the lower track rails incident to decrease in the angularity of the carrier arms as the movement of the conveyor continues, they are automatically returned to normal position under gravitational influence, so that in advancing further, the rollers are obliged to under-travel the scoops and be thereby directed beneath the upper rails of the respective tracks.

13. Treating apparatus according to claim 9, wherein the control means further includes levers respectively arranged lengthwise of the tracks, opposing springs for maintaining the levers yieldingly in normal position, wherein the pivoted elements are of spoon-like configuration with scoops at their front ends and with rearwardly extending counter-weighted shanks, said elements being medially fulcrumed on the levers and normally stopped in an inclined position, whereby, upon engagement of their scoops by the rollers on the holder, they are swung upright, and upon momentary recession of the rollers within the scoops onto the extended front ends of the lower rails of the respective tracks incident to decrease in the angularity of the carrier arms as the movement of the conveyor continues, they are automatically returned to normal position under gravitational influence, so that in advancing further, the rollers are obliged to under-travel the scoops and be thereby directed beneath the upper rails of the respective tracks.

14. Treating apparatus according to claim 9, wherein the holder rotating means comprises a toothed pinion fast on one of the trunnions of the holder; and a rack along one of the tracks beyond the control means to cooperate with the pinion.

15. In apparatus for treatment with liquids, a well containing treating liquid; an endless conveyor having attached thereto, with capacity for rotation about a horizontal axis, a carrier comprising a holder with a frontal opening for insertion of a supporting tray for articles to be treated, with releasable means for retaining the tray; means defining a circuitous course for the conveyor with a portion thereof extending to a loading and unloading station beyond the well, and with a portion thereof diverted downwardly within the well for immersion of the tray holder in the liquid; means within the well along the path of the conveyor for rotating the tray holder about its axis during submergence in the liquid; a crank arm with a roller thereon affixed to the pivot axis of the tray holder; and a horizontally-arranged cam element further along the path of the conveyor overtravelled by the latter and having oppositely inclined ends for cooperation with the roller arm to additionally turn the tray holder and bring it upright with its frontal opening accessible for removal of the tray in the event that it has not been so positioned before reaching the loading and unloading station.

16. Treating apparatus according to claim 15, further including a pair of vertically-arranged track rails at the loading and unloading station between which the roller on the crank arm is guided after it leaves the cam element to keep the holder upright during loading and unloading.

17. Treating apparatus according to claim 15, wherein the course of the conveyor is vertical at the loading and unloading station, further including a roller free on the pivot axis of the tray holder; and two pairs of vertically-arranged track rails at the loading and unloading station between one pair of which the roller on the crank arm is guided after it leaves the cam element, and between which the second mentioned is concurrently guided to keep the holder upright during loading and unloading.

18. In apparatus for treatment with liquids, a well containing treating liquid; an endless conveyor having attached thereto with capacity for rotation about a horizontal axis, a carrier comprising a holder with a frontal opening for insertion of a tray for containing articles to be treated and with releasable latch means for retaining the tray; means for defining a circuitous course for the conveyor with a portion thereof extending to a loading and unloading station beyond the trough, and with a portion thereof diverted downwardly within the trough for immersion of the tray holder in the liquid; means within the trough along the path of the conveyor for rotating the tray holder about its axis during its submergence in the liquid; a righting means further along the path of the conveyor additionally rotating the tray holder to bring it upright with its frontal opening accessible for removal of the tray in the event it is not so before reaching the loading and unloading station; the course of the conveyor being vertical at the loading and unloading station; a crank arm with a roller thereon affixed to the pivot axis of the tray holder; another roller freely rotative on the pivot axis of the tray holder; the righting means comprising a horizontally arranged cam element which is overtraveled by the conveyor and having oppositely inclined ends to cooperate with the roller on the crank arm of the carrier; and further including two pairs of vertically arranged track rails of the loading and unloading station between one pair of which the roller on the crank arm is guided after it leaves the aforesaid cam element, and between the other pair of which the other roller is concurrently guided to keep the holder upright during loading and unloading.

THOMAS J. KEARNEY.
FLOYD E. McGREGOR.

References Cited in the file of this patent

UNITED STATES PATENTS

| Number | Name | Date |
|---|---|---|
| 270,895 | Guest | Jan. 23, 1883 |
| 465,198 | Patterson et al. | Dec. 15, 1891 |
| 677,162 | Winters | June 25, 1901 |
| 757,535 | Wright | Apr. 19, 1904 |
| 807,162 | Gardner | Dec. 12, 1905 |
| 886,097 | Vaudreuil | Apr. 28, 1908 |
| 1,090,156 | Kendall | Mar. 17, 1914 |
| 1,249,286 | Stone | Dec. 4, 1917 |
| 1,381,347 | Schaller | June 14, 1921 |
| 1,804,331 | Freund | May 5, 1931 |
| 1,869,845 | Fowler et al. | Aug. 2, 1932 |
| 1,901,471 | Potthoff | Mar. 14, 1933 |
| 2,073,576 | Climenhaga | Mar. 9, 1937 |
| 2,101,840 | Dinley | Dec. 14, 1937 |
| 2,107,890 | Frank | Feb. 18, 1938 |
| 2,178,701 | Petre | Nov. 7, 1939 |
| 2,256,663 | Brewer | Sept. 23, 1941 |
| 2,289,763 | Earp | July 14, 1942 |
| 2,329,787 | Romano | Sept. 21, 1943 |